United States Patent [19]
Leith et al.

[11] Patent Number: 5,299,035
[45] Date of Patent: Mar. 29, 1994

[54] HOLOGRAPHIC IMAGING THROUGH SCATTERING MEDIA

[75] Inventors: Emmett N. Leith, Canton; David S. Dilworth, Ann Arbor; Hsuan S. Chen, Midland; Ye Chen, Ann Arbor; Joaquin L. Lopez, Ann Arbor; Janis A. Valdmanis, Ann Arbor, all of Mich.

[73] Assignee: University of Michigan, Ann Arbor, Mich.

[21] Appl. No.: 857,546

[22] Filed: Mar. 25, 1992

[51] Int. Cl.⁵ .................. G03H 1/02; G03H 1/04; G03H 1/08

[52] U.S. Cl. .................................... 359/9; 359/1; 359/28; 359/30; 359/35; 359/900; 382/6

[58] Field of Search ............. 359/3, 4, 9, 22, 24, 359/25, 21, 30, 31, 32, 33, 35, 599, 28, 1, 900; 382/6

[56] References Cited

U.S. PATENT DOCUMENTS

| | | | |
|---|---|---|---|
| 3,614,426 | 10/1971 | Donzelle | 359/9 X |
| 3,639,029 | 2/1972 | Haines | 359/30 |
| 4,432,597 | 2/1984 | Bjorklund et al. | 359/32 X |
| 5,126,862 | 6/1992 | Hong et al. | 359/28 X |

Primary Examiner—Scott J. Sugarman
Assistant Examiner—David R. Parsons
Attorney, Agent, or Firm—Rohm & Monsanto

[57] ABSTRACT

An image of an object embedded in a diffusing medium is formed by propagating a coherent or equivalent light pulse through the diffusing medium and applying a reference pulse so as to gate precisely the first emerging light transmitted through the diffusing medium. An ultra-short pulse, having a duration on the order of 150 fs, insures that only the first emerging light is used to form a hologram. Instability in the diffusing medium, which may be inherent therein, as is the case with living tissue, or artificially induced therein, such as by vibrating the specimen, ensures that a subsequent hologram has a different background noise and speckle pattern. Integration of such holograms causes the background noise to average out, but time-invariant features, such as the object being imaged, become increasingly more visible as more holograms are integrated.

31 Claims, 3 Drawing Sheets

HOLOGRAPHIC IMAGING THROUGH SCATTERING MEDIA

GOVERNMENT RIGHTS

This invention was made under grants awarded by the National Science Foundation, under Grant Numbers NSF-G-ECS-8212472, NSF-G-ECS-8610095, and NSF-G-ECS-900571; and by the U.S. Army Research Office and by the U.S. Air Force Office of Scientific Research under Grant Number DAA1-03-88-K-0177. The government has certain rights in the invention.

BACKGROUND OF THE INVENTION

This invention relates generally to imaging systems, and more particularly to methods and apparatus for producing images of objects embedded in diffusing media, specifically including unstable diffusing media, such as the flesh of a living being.

The problems associated with imaging through a diffusing, or irregular, medium are among the most challenging of imaging science. For example, the medium may be a turbulent atmosphere, through which the object to be imaged is recognizable, but the image thereof is degraded, or at the other extreme, the medium may be so severely scattering that, although light is transmitted therethrough, the wavefronts are distorted beyond recognition. Such materials are sometimes called "translucent." If light from an object is transmitted through such a medium, the image that can be formed from the emerging light is extremely coarse, or perhaps no image whatsoever of the object can be seen.

When a medium transmits light, irrespective of the extent to which it is distorted, practitioners in this optical art have sought ways to recover the information that had been impressed on the light. The problem, however, is extremely difficult and has, for the most part, remained intractable.

One of the most important examples of imaging through scattering media lies in the field of medical imaging. The possibility of seeing absorbing structures inside living tissue, without resort to invasion, has attracted many researchers. However, this form of medical imaging presents problems which are particularly challenging because living tissue is extremely diffusing, unstable, and highly absorbing at many wavelengths.

A short pulse of light which passes through a highly scattering medium undergoes multiple scatter events and emerges as a greatly elongated pulse. The light which is scattered the least has travelled the shortest path, and therefore, emerges first. Nevertheless, a shadowgraph image projected onto the emerging surface will in general be extremely blurred. The originally short pulse emerges as a pulse orders of magnitude longer in duration, as a result of the multiple scattering. The light which first emerges from the diffusing medium is therefore the least scattered component.

There is, therefore, a need to isolate the first emerging light from the remainder of the elongated emerging pulse. In order to resolve small objects, illustratively on the order of 1 or 2 mm, subpicosecond light pulses would be required. In addition, detectors having high sensitivity are needed because the amplitude of the transmitted light is also quite low.

The most common and long-standing ultrafast gating methods used for imaging are the Kerr shutter and the streak camera. However, each has its own particular disadvantages in these applications. The Kerr shutter, although extremely fast (subpicosecond) and jitter free, requires a high peak power amplified laser system, which tends to be cumbersome and typically runs at low repetition rates, generally on the order of kHz. The Streak camera, on the other hand, while convenient to use, cannot attain subpicosecond jitter-free operation at high repetition rates. Typical resolution specifications for synchroscan-type cameras having high repetition rates are only on the order of 5–10 picoseconds.

Holographic gating in the form of light-in-flight (LIF) holography or chronocoherent imaging, has also been used to isolate the first-arriving light. These techniques provide jitterfree, low-power, high-pulse-repetition-rate, two-dimensional imagery, with a temporal resolution virtually the same as the pulse duration. However, the LIF-type configuration does not necessarily produce the best spatial resolution with such short pulse durations.

The limitations of the holographic methods are considerable. First, the portion of the light which is not coincident with the reference beam, and therefore does not interfere with it, nonetheless contributes to the exposure process, producing ambient background which lowers the contrast of the recorded interference pattern and subsequently raises the noise level. If the pulse is lengthened by, for example, a factor of $10^4$ by the scatter process, then the background light will be of the order of $10^4$ greater than the preferred light. This effect ranges from deleterious to disastrous, depending on the amount of scatter-induced pulse lengthening.

A second serious problem is that the exposure time available for recording the hologram is limited by the time over which the object motion is negligible. This is a basic problem of holography. If, for example, this stability time is 20 ms, a typical value for living tissue, the hologram exposure must be done within this time interval, otherwise the fringes to be recorded will be smeared. During 20 ms, many thousands of pulses might be recorded, but 20 ms is a rather short hologram recording time. If sufficient energy is to be delivered during this exposure time, the needed light intensity could be higher than can be tolerated.

Finally, conventional materials, such as photographic film, have low quantum efficiency, thus making extremely inefficient use of the light they receive. It is partly for this reason that electronic cameras have totally dominated over photographic film in such applications as computer-aided tomography.

Electronic holography is a form of holography wherein a hologram is formed on the surface of a detector, such as a CCD camera. The hologram is read out, typically into a computer, which then computes the image in a manner analogous to the conventional reconstruction process. The resulting image is displayed on a monitor. Since the resolution of a CCD camera is limited in comparison to photographic film, steps must be taken to insure that the signal falling on the detector is sufficiently coarse to fall within the spatial frequency capability of the camera. This form of holography, however, provides the advantage that the exposure time of each hologram can be quite short, and the holographic reconstruction process can be carried out digitally, and the image stored.

It is, therefore, an object of this invention to provide a system which simply and economically produces images of objects embedded in a diffusing medium.

It is another object of this invention to provide a system which produces images of internal features of a living being.

It is also an object of this invention to provide a method of propagating a light beam through the flesh of a living being to produce an image of the features therein.

It is a further object of this invention to provide a system for producing images of internal features of a living being without subjecting the living being to ionizing radiation.

It is additionally an object of this invention to provide a system for producing images of objects embedded in a diffusing medium, wherein the diffusing medium has a time-varying diffusion characteristic.

SUMMARY OF THE INVENTION

The foregoing and other objects are achieved by this invention which provides, in a first method aspect thereof, a method of imaging an object, the method including the steps of:

propagating a first coherent light pulse through an unstable diffusing medium in which the object to be imaged is embedded, the instability of the unstable diffusing medium being characterized by a diffusion characteristic which changes at a substantially predeterminable time rate of change;

combining a light from the first coherent light pulse which has been propagated through the unstable diffusing medium with a second coherent light pulse, the second coherent light beam pulse having a second pulse duration which is very short as compared to the time rate of change of the diffusion characteristic, whereby the diffusion characteristic changes insignificantly during the second pulse duration, the second coherent light pulse being timed to combine with an initial portion of the first coherent light pulse propagated through the unstable diffusing medium to form a holographic interference image; and imaging the holographic interference image onto an optical input of a recording device within a first exposure period having a predetermined duration which is short as compared to the time rate of change of the diffusion characteristic, whereby the diffusion characteristic changes insignificantly during the predetermined exposure period.

In accordance with a preferred embodiment of the first method aspect of the invention, the optical image of the photoelectric device may be a detector array of a CCD camera. In such an embodiment, the steps of propagating, combining, and imaging, as set forth hereinabove, are repeated within the exposure period, such that multiple holographic interference images are received at the optical input. In such an embodiment, each successive holographic interference image is substantially identical to the other holographic interference images during the exposure time, because the exposure time is itself quite small as compared to the rate at which the diffusion characteristic of the diffusing medium changes with time. However, after an interexposure delay period having a duration which is significant as compared to the time rate of change of the diffusion characteristic, whereby the diffusion characteristic changes during the interexposure delay period, the steps of propagating, combing, and imaging are repeated during a second exposure period, which, like the first exposure period, is short as compared to the time rate of change of the diffusion characteristic. Thus, the hologram produced during the subsequent exposure period will be different from that of the first exposure period, particularly with respect to those elements which cause the diffusion. In other words, objects which are stable or time-invariant within the diffusing medium, or which change much more slowly than the diffusing medium, such as the object to be imaged, remain substantially constant during successive exposures. The diffusing medium itself, however, will vary from exposure to exposure, such that when the multiple exposures are integrated electronically, the appearance of the time-invariant object is improved.

In the case of living tissue, it is expected that the tissue will remain, from the standpoint of diffusion characteristic, stable for a period of about 1 ms. A hologram recorded over such a short exposure period would be expected to have a poor signal-to noise ration (SNR). However, the holograms are recorded sequentially, with time intervals much greater than the stability time of 1 ms between the exposures. For each hologram, a reconstruction is made digitally, and the image is stored. Images from separate holograms are added. Thus, the various noise sources, i.e., photon noise, speckle noise from scattering tissue, etc. are significantly reduced. By way of example, if successive exposures are 100 ms apart, then over a period of 5 minutes 3000 holograms are formed and their images combined. Assuming that the SNR is proportional to the number of exposures, the composite image should have a SNR of $3000^{\frac{1}{2}}=55$ times better than a single exposure. Thus, the inherent instability of living tissue, which is a severe problem for conventional holography, becomes a significant advantage in electronic holography.

Further in accordance with the first method aspect of the invention, prior to performing the step of propagating there are provided the steps of forming a coherent source light pulse, and splitting the coherent source light pulse to form the first and second coherent light pulses. Thus, the first and second coherent light pulses originate from the same source of coherent light which may, in certain embodiments, be a balanced colliding pulse mode-locked ring dye laser which generates 150 fs pulses at 620 nm at a repetition frequency of 100 MHz with an average power of about 20 mW.

It is to be understood that the advantages of the invention are not limited to diffusing media which are inherently unstable. Thus, the invention is not limited to in vivo subjects. Inanimate objects can be vibrated to induce instability. Preferably, the amplitude of the induced vibrations is sufficiently large to cause the aforementioned noise sources to average one another out during the holographic integration process, yet small in comparison to the size of the object desired to be imaged.

After a holographic interference image is propagated onto the optical input of the recording device, the holographic interference image is converted into a corresponding electrical signal. Data corresponding to the electrical signal is stored in the recording device, and subjected to Fourier transformation. The transformed data is then filtered to retain a portion thereof which corresponds to a first order diffracted beam of the holographic interference image. Thereafter, the filtered data is reverse transformed to form a processed image signal.

In a specific illustrative embodiment of the first method aspect of the invention, the step of combining includes the steps of first illuminating an image diffuser of a beam combiner with the light from the first coherent light pulse which has been propagated through the unstable diffusing medium, first propagating an image formed on the imaging diffuser along a first imaging path toward the optical input of the recording device, second illuminating a reflector of the beam combiner arranged in the imaging path to be substantially parallel to the imaging diffuser with the second coherent light pulse, and second propagating the second coherent light pulse reflected from the reflector of the beam combiner along a second imaging path toward the optical input of the recording device. In essence, this embodiment employs an imaging diffuser and reflector-type beam combiner. In such an embodiment, it is preferred that the respective beams which form the interference image not be directed to the optical input of the recording device parallel to one another. In a specific illustrative embodiment of the invention, the beam recombination would be at about 5°.

It is important that the second coherent light pulse be synchronized with the first transmitted light of the first coherent light pulse. Such a synchronization, which ensures that the holographic interference image contains the information only in the first arriving light, is achieved by modifying the length of a path of travel of a second coherent light pulse. The remainder of the light which is the excess of the transmitted pulse over the original duration of the first coherent light pulse is removed, as it produces merely an ambient background with no information. This extraneous background is removed in the reconstruction process, leaving only the desired image produced by the first-arriving light.

In accordance with a further method aspect of the invention, the method includes the steps of:

dividing the coherent light to produce object and reference beams of the short duration pulses of coherent light;

propagating the object beam of the short duration pulses through a diffusing medium in which the object to be imaged is embedded;

combining a first light from the object beam of the short duration pulses which has been propagated through the diffusing medium with the reference beam of the short duration pulses; and imaging the holographic interference image onto an optical input of a recording device within a first exposure period.

In accordance with an apparatus aspect of the invention, a system for scanning an object embedded in a diffusing medium is provided with a first light source for propagating a first coherent light pulse through the diffusing medium in which the object to be imaged is embedded. A second light source produces a second coherent light pulse, and a combiner combines the light from the first coherent light pulse which has been propagated through the diffusing medium with the second coherent light pulse. A synchronizer adjusts a time of issuance of the coherent light pulse, such that the second coherent light pulse is timed to combine specifically with the initial portion of the first coherent light pulse which is propagated through the diffusing medium, and to form a holographic interference image therewith. A recording apparatus, such as a CCD camera, receives the holographic interference image and forms a hologram representative of the initial portion of the first coherent light pulse propagated through the diffusing medium.

In embodiments of the invention where the diffusing medium is unstable, the instability of the unstable diffusing medium is characterized by a diffusion characteristic which changes at a substantially predeterminable time rate of change, the second coherent light pulse being characterized by a second pulse duration which is very short as compared to the time rate of change of the diffusion characteristic, whereby the diffusion characteristic changes insignificantly during the second pulse duration.

The entire exposure period has a predetermined duration which is short as compared to the time rate of change of the diffusion characteristic, whereby the diffusion characteristic changes insignificantly during the exposure period. In embodiments where the diffusing medium is living tissue, the predetermined duration of the first exposure period is less than approximately 7 ms. Typically, each frame can be exposed for approximately 1 ms. Means are provided for forming holograms, and with the aid of electronic circuitry, images from successive holograms are integrated with one another, whereby variant noise, such a background noise, will be significantly averaged out.

In order to achieve the advantageous averaging out of the background noise, the respective exposure periods are separated in time from one another by interexposure delay periods which have a duration which is significant compared to the time rate of change of the diffusion characteristic. Thus, each such exposure will have a different background noise characteristic responsive to the different states of the diffusion medium at the particular times at which the exposures were made. However, time-invariant features, such as the object to be imaged, remain constant. The interexposure delay period is longer than 20 ms and may be as long as several minutes.

In a preferred embodiment of the invention, the first and second light sources are derived from a single beam of light which is subjected to a beam splitter which divides same into the first and second light pulses. The beam splitter is arranged so that the first light pulse contains a higher amplitude of optical energy than the second light pulse. Thus, when the beams are subsequently combined, the additional initial energy of the first light pulse compensates for losses during transmission through the diffusing medium. As previously stated, the short pulses of light from the laser source have a very high repetition rate, wherein a multiplicity of such short pulses are produced during any given exposure period. A typical repetition frequency may be on the order of 100 MHz, also as previously described.

BRIEF DESCRIPTION OF THE DRAWING

Comprehension of the invention is facilitated by reading the following detailed description, in conjunction with the annexed drawing, in which.

DETAILED DESCRIPTION

Figure 1:
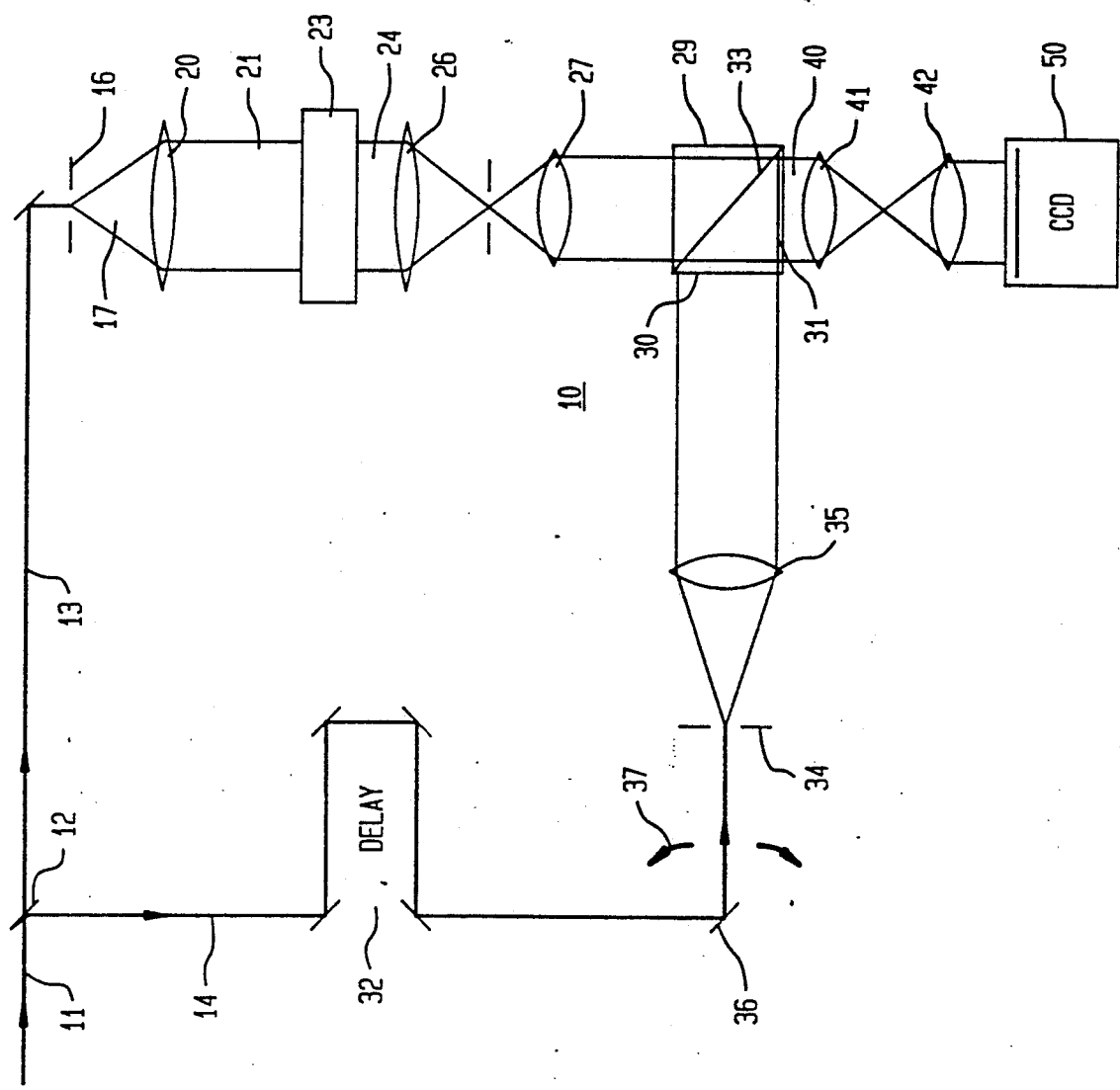
FIG. 1 is a schematic representation of a basic system constructed in accordance with the principles of the invention.

FIG. 1 is a schematic representation of a basic system configured in accordance with the principles of the invention for achieving images of absorber objects embedded in a diffusing medium. As shown in FIG. 1, imaging system 10 receives a source beam 11 from a laser (not shown). The source beam is in the form of optical pulses (not specifically shown), and in this specific illustrative embodiment, the laser which supplies such pulses can be a balanced colliding-pulse mode-locked ring dye laser which generates 150 fs pulses at 620 nm at a repetition frequency of some 100 MHz with an average power of approximately 20 mW. Source beam 11 is propagated to a beam splitter 12 which produces an object beam 13 and a reference beam 14. Beam splitter 12 is configured to direct a majority of the light energy, illustratively 90% of source beam 11, as the object beam. This serves to compensate, at least partially, for the large scattering losses within the object to be imaged, as will be discussed hereinbelow.

Object beam 13 is propagated to a beam expander 16 which operates as a spatial filter whereby the object beam, in a region 17, becomes divergent. The divergent beam is then collimated by a lens 20, so as to produce a bandwidth-limited parallel object beam 21.

Object beam 21 is propagated to impinge upon tank 23 which contains the diffusing medium and the object to be imaged (neither of which are specifically shown in this figure). In this specific embodiment, the object to be imaged is a set of wires which will be described hereinbelow with respect to FIG. 2. Emerging light 24 from the other side of tank 23 is subjected to a lens system formed of lenses 26 and 27 whereby the emerging light is imaged onto a beam combiner 29. Beam combiner 29 has a further optical input 30 for receiving the short pulses of reference beam 14, and is of the type having a reflector 33 therein and an imaging diffuser 31 at its output.

Reference beam 14 is propagated through a delay system 32 which is adjustable so as to permit the pulses which are received at optical input 30 to be timed with the first emerging light from tank 23. The delay operates in a conventional manner by permitting variation in the length of the path traveled by reference beam 14. After propagation through delay system 32, the reference beam is reflected by a mirror 36 which, in this specific illustrative embodiment, is movable so that the reference beam is angularly displaceable, as shown by arrows 37. The reference beam is then subjected to a beam expander 34, whereby the reference beam becomes divergent and is subsequently collimated by a lens 35. The combination of emerging light 24 and reference beam 14 exit beam splitter 29 as a combined beam 40 which contains a holographic interference image (not specifically shown in this figure). The combination of emerging light 24 and reference beam 14 may not be parallel, depending upon the angular orientation of mirror 36. The holographic interference image on imaging diffuser 31 is then imaged by operation of lenses 41 and 42 onto the detector array of a CCD 50. CCD 50 may be a camera which images an object field of approximately 30 mm×40 mm.

The electrical signals from CCD 50 are converted to digital signals for processing in a computer (not shown). The computer stores digital signals in memory; subjects the digital signals to Fourier transformation; divides the signal into first arriving light and other light; calculates and records mathematical properties regarding the first arriving light and the other light; reverse Fourier transforms the first arriving light; mathematically corrects for determinable noises (laser, optical, electronic) in the system; and produces an image of the first arriving light.

Figure 2:
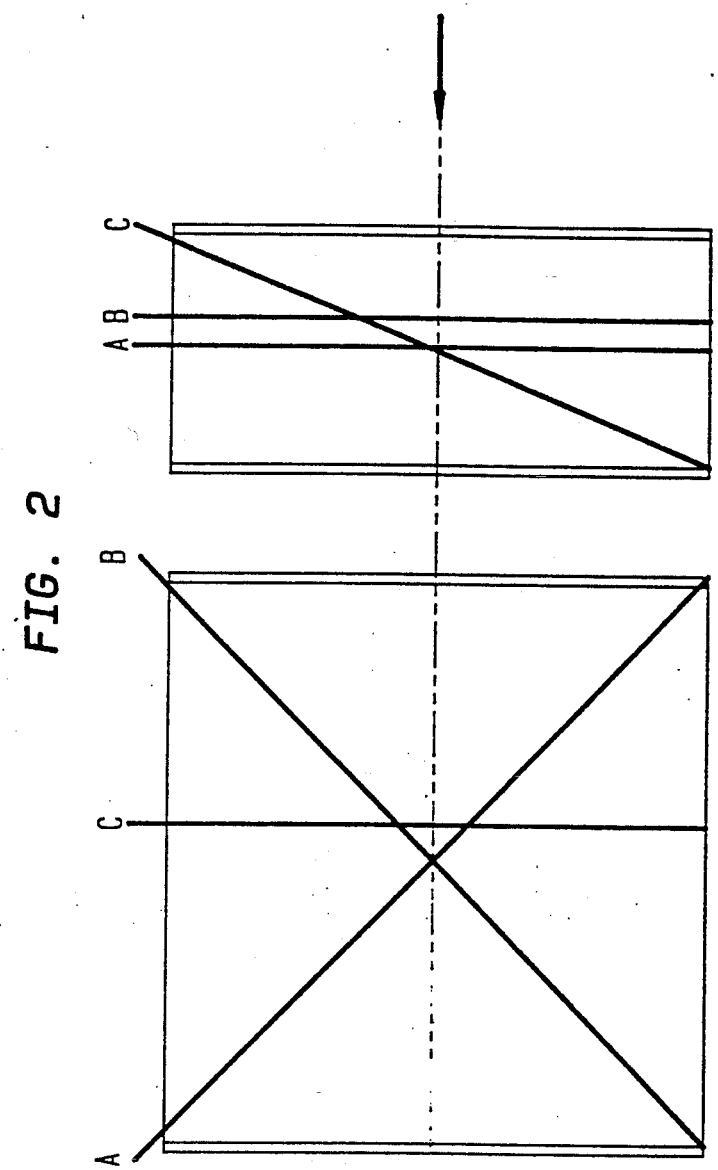
FIG. 2 is a schematic representation of a specimen object formed of three wires embedded in a diffusing medium.

FIG. 2 are plan and side views of three wires, identified as a, b, and c, which are used to test imaging system 10 of FIG. 1. The three wires are embedded in a diffusing medium and installed in tank 23 of the imaging system. Referring once again to FIG. 2, wire hall is installed in the middle of the tank, and wire "b" is installed one-third of the distance from the entrance surface to the exiting surface. Wire "c" is arranged as shown so as to extend transversely from the entrance to the exiting surfaces.

Figure 3:
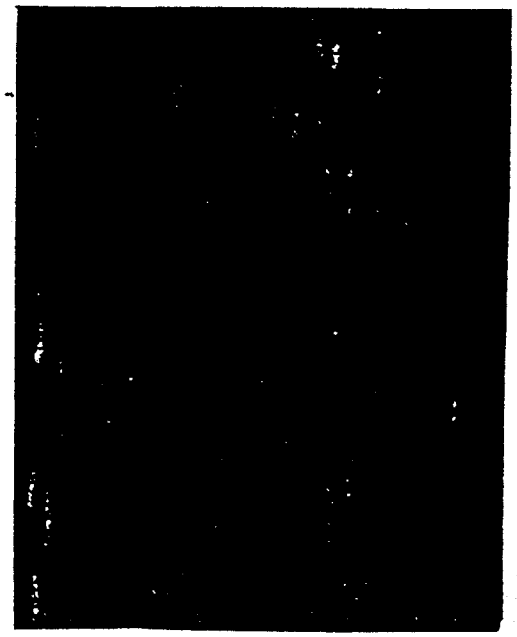
FIG. 3 is an incoherently back-lighted photograph of the wire object of FIG. 2 in a tank filled with water containing no diffusing particles.

FIG. 3 shows an incoherently back-lighted photograph of the wire objects in the tank, which is filled with water and contains no diffusing particles. The image shows only the center (approximately 7.5 mm×10 mm) of the field that was selected for subsequent electronic processing.

Figure 4:
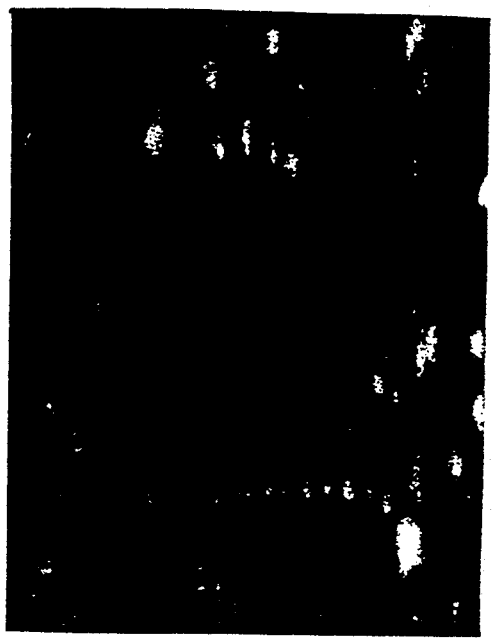
FIG. 4 is a photograph of the object of FIG. 2 arranged in a diffusing medium and back-lighted with a laser beam.

FIG. 4 shows the same view as FIG. 3 but with the diffuser medium added and the back-lighting is performed by a laser beam. The specimen wires cannot be seen in this figure.

Figure 5:
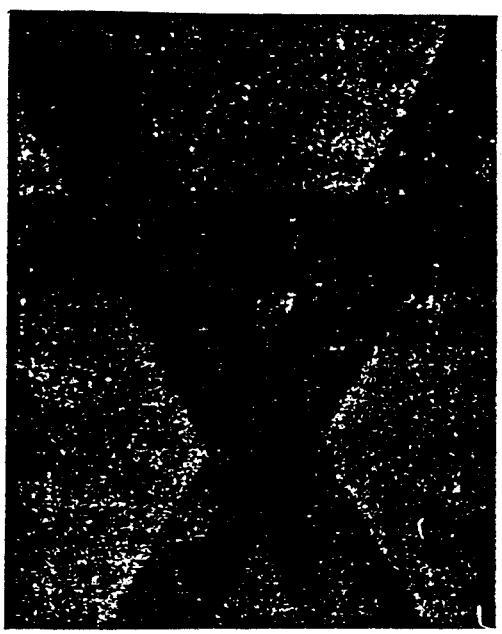
FIG. 5 is a representation of the image of FIG. 4 formed from a single hologram.

FIG. 5 shows the result achieved with ultrafast gated holographic technique after a single-frame exposure. The wire objects are somewhat visible in this figure. The exposure time for FIG. 5 was limited by the stability time of the diffuser medium (about 1 ms for living tissue) and is of poor quality because of an inherent random noise term. The random noise term can be decreased by processing more frames, provided first that the diffuser medium has changed sufficiently to decorrelate speckle (about 20 ms for living tissue), and second that the diffuser medium has not changed sufficiently to distort the image of the embedded object. The duration of this time period is dependent upon the type of tissue and the manner in which it is held. The additional frames are filtered in a manner similar to the first image, except they are merged with the previously processed images.

Figure 6:
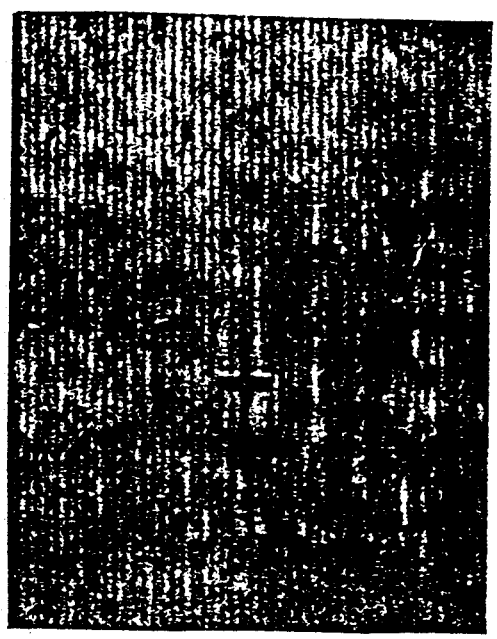
FIG. 6 is a representation of an image formed by superposition of images from 25 holograms.

FIG. 6 illustrates the result achieved after 25 images have been integrated. This represents a decrease in the random noise term by a factor of 5 (25½). It is therefore apparent that the integration process significantly enhances the image. Moreover, inspection of the image shows that the spatial resolution is easily in the submillimeter range. It is to be noted, however, that FIG. 6 also shows a persistent noise component which appears not to decrease with averaging. This is attributable to time-invariant artifacts, such as dust, scratches, etc., in the reference beam.

In the practice of the invention, an advantage is achieved by assuring that the components of reference beam 14 and emerging light 24 which comprises combined beam 40 not be parallel to one another. In other words, the introduction of the reference beam may, in certain embodiments, be off-axis, which leads to finer structure in one dimension. The reference beam angle should be no larger than needed, and in fact, should be the minimum angle which allows adequate separation of the various terms arising in the holographic process. In some embodiments, an angle on the order of 5° may be used.

In addition to the foregoing, it is to be noted that the spatial frequency spectrum of the object and reference beams is limited by a spatial filter in the form of a restrictive aperture, in this embodiment. Since CCD 50 has a limited number of pixels, typically about 500×500, the light impinging on the detector should have a space bandwidth product of about the same amount. The optics are arranged to make the magnification correct so that the 500×500 imaging elements, actually speckle elements, just fit across the detector. Any finer structure in the object field will just become ambient background light, further decreasing the SNR. A rectangular aperture limits the spatial frequency pass band so that the spatial frequency content of the recorded hologram is the same in each dimension. By using a rectangular, instead of a square, aperture, the utilization of the detector is maximized.

In particular, it is well-known in holography that a light source of short coherent length is equivalent to a light source of short pulses. Hence, although the specific illustrative embodiment of the invention has been described in terms of short-pulse light, it is clear that in all cases non-pulsed light with coherence length equal to the pulse length can be substituted.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A method of imaging an object, the method comprising the steps of:
   propagating a first light pulse through an unstable diffusing medium in which the object to be imaged is embedded, the instability of said unstable diffusing medium being characterized by a diffusion characteristic which changes at a substantially predeterminable time rate of change;
   combining a light from said first light pulse which has been propagated through said unstable diffusing medium with a second light pulse, said second light beam pulse having a second pulse duration which is very short with respect to said time rate of change of said diffusion characteristic, whereby said diffusion characteristic changes only insignificantly during said second pulse duration, said second pulse duration and said substantially predeterminable time rate of change of said diffusion characteristic being related to one another such that said second pulse duration is decreased as said substantially predeterminable time rate of change of said diffusion characteristic is increased, said second light pulse being timed to combine with an initial portion of said first light pulse propagated through said unstable diffusing medium to form a holographic interference image;
   imaging said holographic interference image onto an optical input of a receiving device within a first exposure period having a predetermined duration which is short as compared to the time rate of change of the diffusion characteristic, said first exposure period being selected in response to substantially predeterminable time rate of change of said diffusion characteristic, whereby the diffusion characteristic changes insignificantly during said predetermined exposure period; and
   repeating said steps of propagating, combining, and imaging during a second exposure period having a predetermined duration which is short as compared to the time rate of change of the diffusion characteristic, said second exposure period commencing after expiration of an interexposure delay period following the expiration of said first exposure period, said interexposure delay period having a duration which is significant as compared to the time rate of change of the diffusion characteristic, whereby said diffusion characteristic changes during said interexposure delay period.

2. The method of claim 1 wherein said optical input in said step of imaging is a photoelectric device.

3. The method of claim 1 wherein there are further provided the steps of:
   reading said holographic interference image onto a digital computer;
   calculating in said digital computer to produce an image from said holographic interference image;
   repeating said steps of reading and calculating; and
   summing said images to form an integrated image.

4. The method of claim 3 wherein there is further provided the step of integrating electronically a plurality of said holographic interference images obtained during respective exposure periods, whereby the effect of a background noise component in each such holographic interference image is reduced to an extent corresponding to the number of said holographic interference images being integrated, to obtain a composite image having reduced background noise.

5. The method of claim 1 wherein said unstable diffusing medium is the flesh of a living being.

6. The method of claim 1 wherein prior to performing said step of propagating there are provided the steps of:
   forming a source light pulse; and
   splitting said source light pulse to form said first and second light pulses.

7. The method of claim 1 wherein prior to performing said step of propagating there is provided the step of inducing instability in a diffusing medium to form said unstable diffusing medium.

8. The method of claim 7 wherein said step of inducing instability comprises the step of vibrating said diffusing medium, said diffusion characteristic being responsive to said step of vibrating.

9. The method of claim 1 wherein there are further provided the steps of:
   converting said holographic interference image onto a corresponding electrical signal;
   storing data corresponding to said electrical signal in said recording device;
   subjecting said data to Fourier transformation;
   filtering said transformed data to retain a portion thereof corresponding to a first-order diffracted beam of said holographic interference image; and
   reverse transforming said filtered data to form a processed image signal.

10. The method of claim 1 wherein said step of combining comprises the steps of:
    first illuminating an imaging diffuser of a beam combiner with said light from said first light pulse which has been propagated through said unstable diffusing medium;

first propagating an image formed on said imaging diffuser along a first imaging path toward said optical input of said recording device;

second illuminating a reflector of said beam combiner arranged in said imaging path to be substantially parallel to said imaging diffuser with said second light pulse; and second propagating said second light pulse reflected from said reflector of said beam combiner along a second imaging path toward said optical input of said recording device.

11. The method of claim 10 wherein said first and second imaging paths are not parallel to one another.

12. The method of claim 1 wherein said step of combining comprises the further step of synchronizing said second light pulse with a first transmitted light of said first light pulse.

13. The method of claim 12 wherein said step of synchronizing comprises the step of modifying the length of a path of travel of said second light pulse.

14. A system for imaging an object embedded in a diffusing medium, the system comprising:

first light source means for propagating a first coherent light pulse through the diffusing medium in which the object to be imaged is embedded;

second light source means for producing a second coherent light pulse;

combiner means for combining a light from said first coherent light pulse which has been propagated through said diffusing medium with the second coherent light pulse;

synchronizing means for adjusting a time of issuance of said second coherent light pulse, whereby said second coherent light pulse is timed to combine with an initial portion of said first coherent light pulse propagated through said diffusing medium to form a holographic interference image; and recording means for receiving said holographic interference image and forming a hologram representative of said initial portion of said first light pulse propagated through said diffusing medium.

15. The system of claim 14 wherein the diffusing medium is an unstable diffusing medium, the instability of said unstable diffusing medium being characterized by a diffusion characteristic which changes at a substantially predeterminable time rate of change, said second coherent light pulse being characterized by a second pulse duration which is very short as compared to said time rate of change of said diffusion characteristic, said second pulse duration and said substantially predeterminable time rate of change of said diffusion characteristic being related to one another such that said second pulse duration is decreased as said substantially predeterminable time rate of change of said diffusion characteristic is increased, whereby said diffusion characteristic changes insignificantly during said second pulse duration.

16. The system of claim 15 wherein said recording means receives said holographic interference image within an exposure period having a predetermined duration which is short as compared to the time of change of the diffusion characteristic, said exposure period being selected in response to substantially predeterminable time rate of change of said diffusion characteristic, whereby the diffusion characteristic changes insignificantly during said exposure period.

17. The system of claim 16 wherein the diffusing medium is living tissue, and said predetermined duration of said exposure period is less than approximately 40 ms.

18. The system of claim 16 wherein there are provided a plurality of exposure periods sequentially in time, and there is further provided hologram integration means for integrating a plurality of holograms corresponding to holographic interference images obtained during respective ones of said exposure periods.

19. The system of claim 18 wherein said respective one of said exposure periods are separated in time by respective interexposure delay periods, each such interexposure delay period being selected in response to said time rate of change of the diffusion characteristic, so as to have a duration which is significant as compared to the time rate of change of the diffusion characteristic, whereby said diffusion characteristic changes significantly during said interexposure delay period.

20. The system of claim 19 wherein said interexposure delay period is longer than approximately 1 ms.

21. The system of claim 14 wherein said first and second light source means comprise:

a laser source for producing a beam of coherent light in the form of a plurality of short pulses of light; and beam splitter means for receiving said beam of coherent light and dividing same to produce said first and second coherent light pulses.

22. The system of claim 21 wherein said beam splitter means is arranged so that said first coherent light pulse contains a higher amplitude of optical energy than said second coherent light pulse.

23. The system of claim 21 wherein said short pulses of light from said laser source have a repetition rate wherein a multiplicity of such short pulses of coherent light are produced during an exposure period.

24. A method of imaging an object, the method comprising the steps of:

generating a series of short duration pulses of coherent light;

dividing the coherent light to produce object and reference beams of said short duration pulses of coherent light;

propagating said object beam of said short duration pulses through a diffusing medium in which the object to be imaged is embedded to form a transmitted light in the form of elongated short duration pulses;

combining a first transmitted light from each of said elongated pulses which have been propagated through said diffusing medium with said reference beam of said short duration pulses; and imaging said holographic interference image onto an optical input of a recording device within a first exposure period.

25. The method of claim 24 wherein said diffusing medium is characterized by a diffusion characteristic which changes at a substantially predeterminable time rate of change, and said first exposure period has a predetermined duration which is short as compared to the time rate of change of the diffusion characteristic, said second pulse duration and said substantially predeterminable time rate of change of said diffusion characteristic being related to one another such that said second pulse duration is decreased as said substantially predeterminable time rate of change of said diffusion characteristic is increased, whereby the diffusion characteristic changes insignificantly during said predetermined exposure period.

26. The method of claim 25 wherein during said step of propagating, said short duration pulses of said object beam are elongated in time in response to said diffusing medium, said reference beam of said short duration pulses retaining a pulse duration which is very short as compared to said time rate of change of said diffusion characteristic, said pulse duration being selected in response to substantially predeterminable time rate of change of said diffusion characteristic, whereby said diffusion characteristic changes insignificantly during said second pulse duration.

27. The method of claim 25 wherein there are further provided the steps of:

recording said holographic interference image;

repeating said steps of generating, propagating, combining, and imaging during a subsequent exposure period to produce a subsequent holographic interference image; and integrating said holographic interference image and said subsequent holographic interference image to produce a composite image having reduced noise.

28. The method of claim 27 wherein in said step of generating, a plurality of said short duration pulses of coherent light are generated during each of said exposure periods for each respective holographic interference image.

29. The method of claim 28 wherein said steps of propagating, combining, and imaging are repeated for each of said short duration pulses of coherent light generated during said exposure period.

30. The method of claim 24 wherein there is further provided the step of synchronizing said short duration pulses of said reference beam with said first transmitted light of respective ones of said elongated short duration pulses of said object beam.

31. The method of claim 30 wherein said step of synchronizing comprises the further step of adjusting a path length of said reference beam of said short duration pulses.

* * * * *